United States Patent [19]
Osborne

[11] Patent Number: 6,074,123
[45] Date of Patent: Jun. 13, 2000

[54] BICYCLE STEM WITH ENCLOSED STEERING TUBE CLAMP

[75] Inventor: Pippin Osborne, West Vancouver, Canada

[73] Assignee: Jas D. Easton, Inc., Van Nuys, Calif.

[21] Appl. No.: 09/150,080

[22] Filed: Sep. 9, 1998

[51] Int. Cl.[7] .................................................. B60B 27/06
[52] U.S. Cl. ..................... 403/373; 403/344; 403/290; 74/551.3; 280/280
[58] Field of Search .................................. 403/373, 270, 403/271, 290, 289, 344, 375; 74/551.3, 551.4; 280/279, 280

[56] References Cited

U.S. PATENT DOCUMENTS

| | | | |
|---|---|---|---|
| 4,772,153 | 9/1988 | Huang | 403/290 X |
| 5,193,930 | 3/1993 | Chi . | |
| 5,426,996 | 6/1995 | Chang | 74/551.1 |

*Primary Examiner*—Lynne H. Browne
*Assistant Examiner*—John R. Cottingham
*Attorney, Agent, or Firm*—Roth & Goldman

[57] ABSTRACT

A steering tube clamp and stem assembly for a bicycle or other cycle in which the steering tube clamping parts are concealed inside a stem tube which extends away from the rider. The clamping assembly employs an axially extending cut and intersecting arcuate cuts in a wall of a sleeve which connects to the steering tube and a pair of spaced lugs which are integrally formed with the steering tube sleeve and extend in parallel into the stem tube. A clamping screw head is accessible through an aperture in the wall of the stem tube. The stem tube is welded to the steering tube sleeve and to two additional outside lugs which parallel the concealed lugs to minimize stresses in a welded connection of the stem tube to the sleeve.

10 Claims, 4 Drawing Sheets

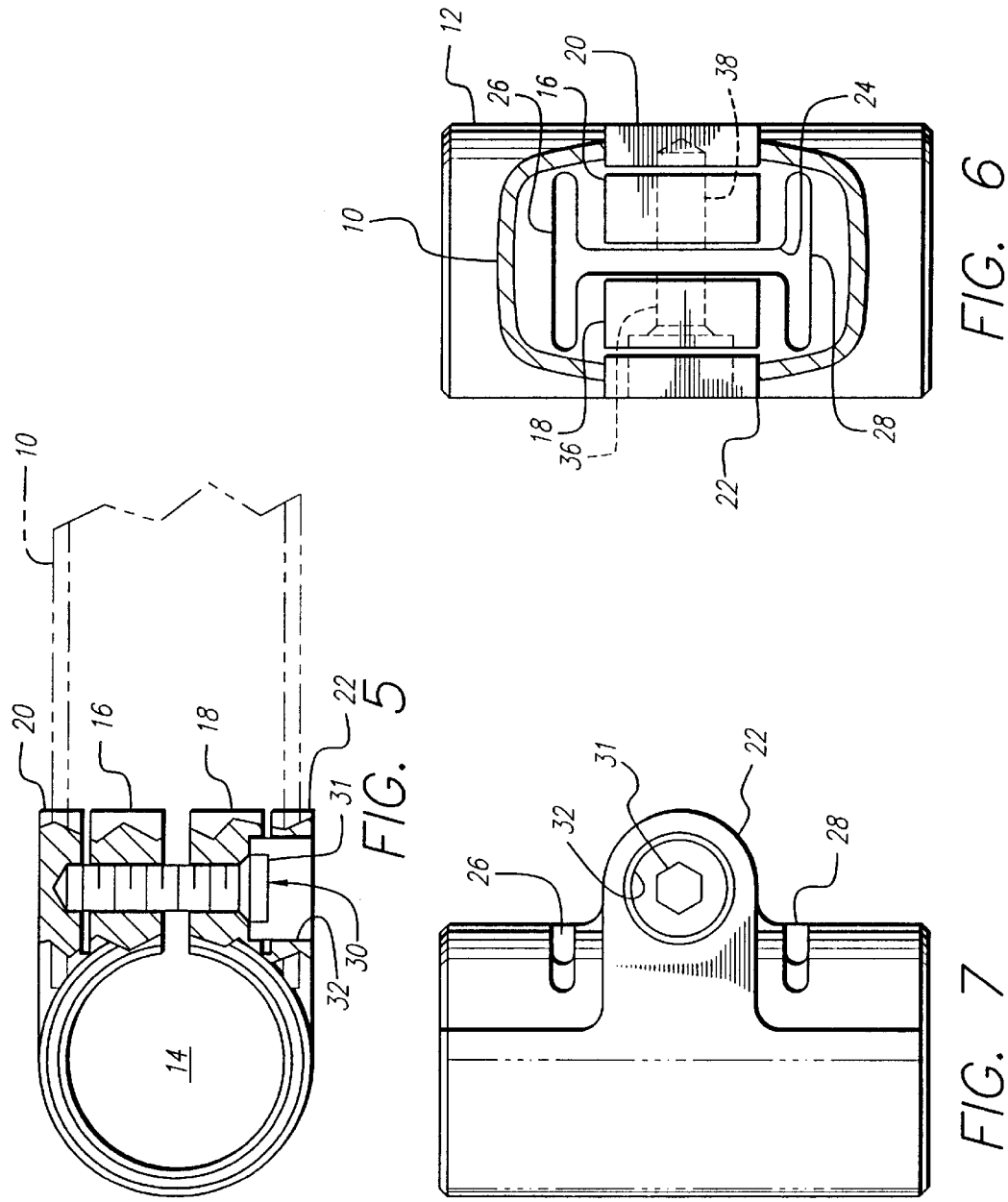

BICYCLE STEM WITH ENCLOSED STEERING TUBE CLAMP

CROSS REFERENCE TO RELATED APPLICATIONS, IF ANY

None

BACKGROUND OF THE INVENTION AND PRIOR ART

1. Field of the Invention

The present invention relates to a steering tube sleeve and stem tube assembly for cycles, particularly lightweight bicycles for recreational riding, racing, or off-road uses.

Since rider safety and reduction of weight is of extreme importance in human-powered cycles such as bicycles, increasing use has been made of strong lightweight composite tubular structures instead of aluminum or steel tubular frame parts and handlebars. Such composites, such as carbon reinforced resins, are easily damaged and the need therefore exists for a steering tube sleeve and stem assembly which can be readily attached to the cycle steering tube and which can be removed therefrom for re-positioning or replacement without damaging the steering tube, particularly when the steering tube is made of composites.

2. Prior Art

U.S. Pat. No. 5,193,930 issued Mar. 16, 1993 to Chi discloses a coupling for securing a handlebar stem to the upper end of a front fork steering tube. Spaced lugs punched out from and extending from a tube sleeve are bolted together and are enclosed by a horizontally extending stem tube which is welded to the sleeve. Access to the clamping bolt is through a hole in the side wall of the stem tube.

Substantial bending and torsional stresses are placed on the connection of a handlebar stem to a steering tube as is well known. Failures occur when structural weaknesses are created by excessive machining of sleeves as by punching lugs therefrom and when welded joints are of insufficient length to adequately withstand the forces applied thereto.

OBJECTS OF THE INVENTION

It is a primary object of the present invention to provide a cycle stem assembly of greater strength and less likelihood of failure under stress and in which the parts which clamp the assembly to the steering tube of a cycle are substantially concealed in the stem tube to avoid danger to the rider and exposure of the parts to rain, dirt and the elements and in which clamping of the assembly to the steering tube places no undue stress on the steering tube sleeve or on the welded joint between the parts.

The features and advantages of the preferred embodiment will become apparent from reading the detailed description which follows.

SUMMARY OF THE INVENTION

The present invention accordingly provides a cycle stem assembly with an enclosed steering tube clamp comprising:
  a) a steering tube sleeve;
  b) means for tightening said sleeve into engagement with an exterior surface of a cycle steering tube comprising first and second spaced generally parallel lugs on an exterior surface of said sleeve and fastener means for moving said lugs toward each other to tighten said sleeve;
  c) third and fourth lugs on said exterior surface of said sleeve, said third and fourth lugs extending generally parallel to said first and second lugs; and
  d) an elongated generally horizontally extending stem tube having one end connected to said steering tube sleeve and means at its other end for attachment of a cycle handlebar, said first and second lugs extending into said stem tube, said third and fourth lugs being rigidly affixed to said stem tube, and said fastener means being accessible from the exterior of said stem tube for moving said first and second lugs toward each other to tighten said sleeve.

BRIEF DESCRIPTION OF THE DRAWINGS

FIG. 5 is a top plan view of the steering tube sleeve, showing the stem tube in phantom.

FIG. 6 is a right side elevation view of the steering tube sleeve of FIG. 5.

FIG. 7 is a front side elevation of the steering tube sleeve of FIG. 5.

DESCRIPTION OF THE PREFERRED EMBODIMENTS

Figure 1:
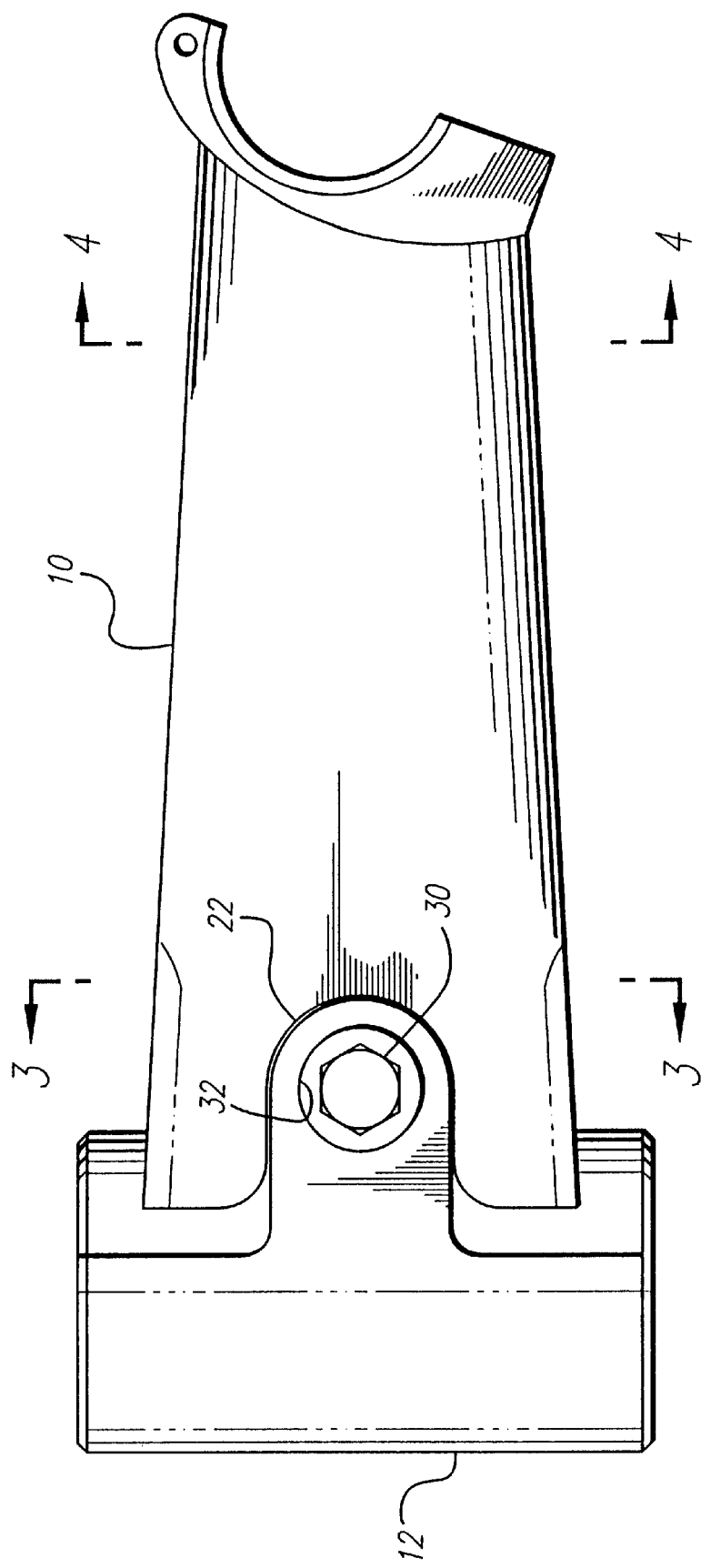
FIG. 1 is a side elevation view of an assembled steering tube sleeve and stem tube.
Figure 2:
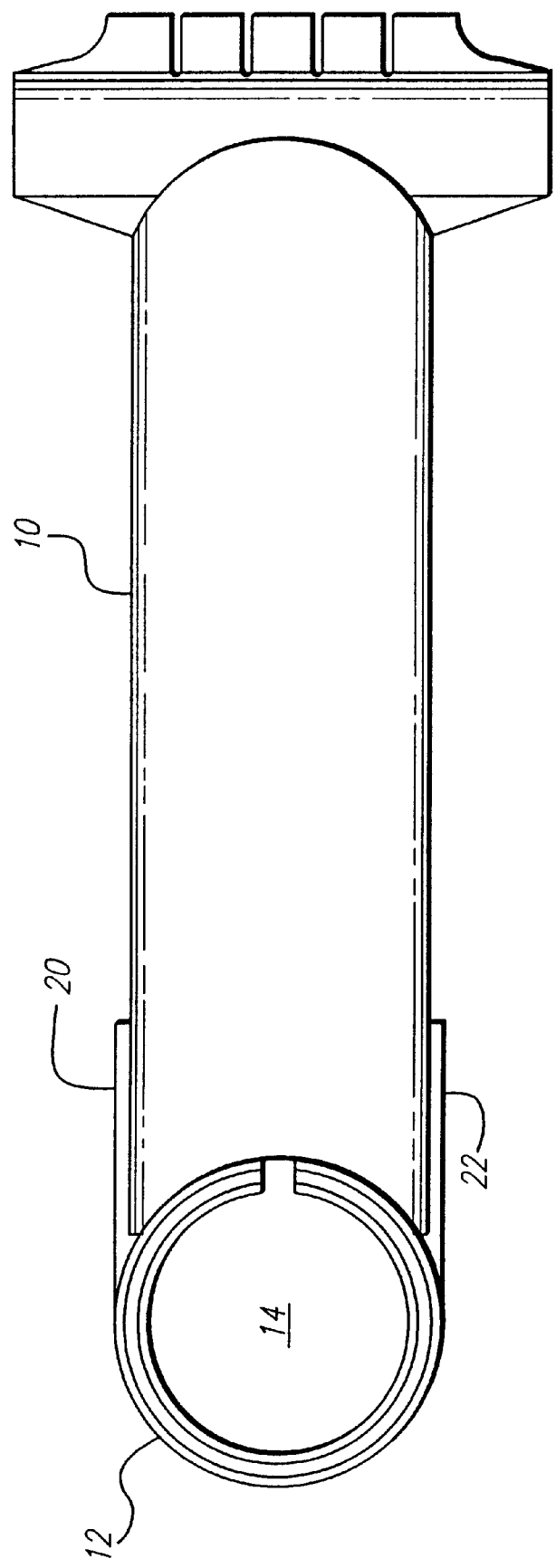
FIG. 2 is a top plan view of the embodiment shown in FIG. 1.
Figure 4:
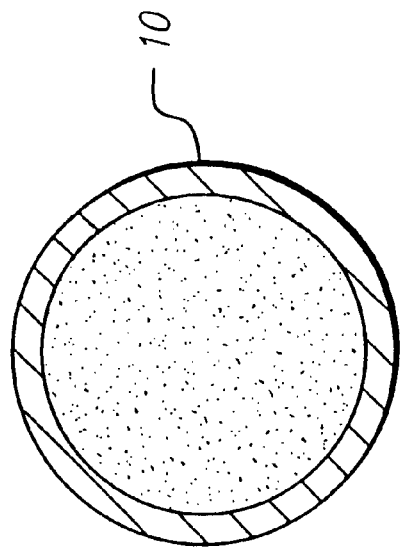
FIG. 4 is a cross-section elevation of the stem tube taken at line 4—4 in FIG. 1.

A cycle stem assembly is used to connect the handlebars of a bicycle or other type cycle to the generally vertically oriented steering tube which is connected to the front wheel fork. The stem assembly is comprised of a preferably hollow elongated generally horizontally extending stem tube 10 which is rigidly affixed to and extends forwardly away from the rider from a vertically extending steering tube sleeve 12 which attaches to the bicycle steering tube, not shown. The stem tube 10 shown in FIG. 1 extends horizontally although it will be appreciated at the angle of orientation of the stem tube 10 relative to the steering tube sleeve 12 can be varied such that the stem tube 10 is forwardly and upwardly inclined if desired. Although reference is made to a stem tube, the term "tube" is intended to encompass solid shapes as well as seamless and seamed tubes of various constant and variable cross-sectional shapes, including circular, oval, rectangular and combinations thereof.

The steering tube sleeve 12 preferably defines a generally cylindrical steering tube receiving cavity 14 therein. The cavity 14 may, however be of hexagonal or other non-circular suitable cross-section for receiving the steering tube. The sleeve 12 is conveniently formed from an aluminum extrusion having a radially extending boss which can be machined or cut to form four separate parallel lugs 16, 18, 20, 22.

Figure 3:
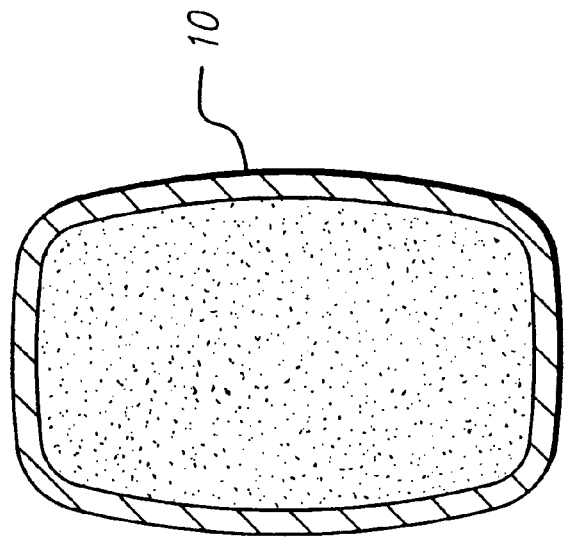
FIG. 3 is a cross-section elevation of the stem tube taken at line 3—3 in FIG. 1.

The stem tube 10 is attached to the steering tube sleeve 12 and outer lugs 20, 22 by welding, the inner lugs, 16, 18 extending into the stem tube 10. As seen in FIG. 3, the stem tube 10 preferably has a cross-section of substantially rectangular rounded corner shape at the end which is welded to the steering tube sleeve 12 as well as around the periphery of each of the outer lugs 20, 22 to provide a weld joint of greater length than previously used or possible in absence of the outer lugs 20, 22.

A fastener comprising a transversely extending clamping screw 30 is accessible from the side of the stem tube 10 through an access aperture 32 and has a hex or slotted head 31 seated in a bore 36 in inner lug 18 and is threadedly received in an aligned threaded bore 38 in lug 16 for clamping the sleeve 12 to the steering tube (not shown).

Clamping movement of lugs 16, 18 toward each other due to tightening of screw 30 is facilitated by cutting an axially elongated opening 24 in the side wall of sleeve 12 between the inner lugs 16, 18 and at least one arcuately elongated opening 26 in the sleeve which intersects one end of the axially elongated opening 24. Preferably, a second arcuately elongated opening 28 is also cut into the side wall of the sleeve 12 intersecting the other end of the axially elongated opening 24 as shown in FIG. 6.

As shown, except for the head of screw 30 which must be accessible, the means for tightening the steering tube sleeve onto the steering tube is entirely concealed within the stem tube 10. Thus no clamping lugs, bolt heads or other sharp parts which might cause injury project toward the rider and the moving clamp parts 16, 18, 30 are substantially all concealed by the stem tube 10 to prevent or minimize contamination by dirt or fouling by rain or moisture. The access aperture 32 can also be covered if desired with a suitable dust cap (not shown).

Persons skilled in the art will readily appreciate that various modifications can be made from the preferred embodiment thus the scope of protection is intended to be defined only by the limitations of the appended claims.

I claim:

1. A cycle stem assembly with an enclosed steering tube clamp comprising:
   a) a steering tube sleeve;
   b) means for tightening said sleeve into engagement with an exterior surface of a cycle steering tube comprising first and second spaced generally parallel lugs on an exterior surface of said sleeve and fastener means for moving said lugs toward each other to tighten said sleeve;
   c) third and fourth lugs on said exterior surface of said sleeve, said third and fourth lugs extending generally parallel to said first and second lugs; and
   d) an elongated generally horizontally extending stem tube having one end connected to said steering tube sleeve and means at its other end for attachment of a cycle handlebar, said first and second lugs extending into said stem tube, said third and fourth lugs being rigidly affixed to said stem tube, and said fastener means being accessible from the exterior of said stem tube for moving said first and second lugs toward each other to tighten said sleeve.

2. The stem assembly of claim 1, wherein said sleeve defines a generally cylindrical steering tube cavity therein.

3. The stem assembly of claim 1, wherein said first, second, third and fourth lugs are integrally formed with said sleeve.

4. The stem assembly of claim 3, further comprising an axially elongated opening in said sleeve between said first and second lugs and at least one arcuately elongated opening in said sleeve which intersects said axially elongated opening.

5. The stem assembly of claim 4, further comprising a second arcuately elongated opening in said sleeve which intersects said axially elongated opening, said arcuately elongated openings being located above and below said lugs.

6. The stem assembly of claim 5, further comprising an access aperture in one of said third and fourth lugs, and wherein said fastener means is a threaded fastener which is slidably received in a bore in one of said first and second lugs aligned with said access aperture, said fastener being threadedly engageable with the other of said first and second lugs.

7. The stem assembly of claim 6, wherein said stem tube is welded to said third and fourth lugs and to said sleeve.

8. The stem assembly of claim 7, wherein said lugs extend generally parallel with said stem tube.

9. The stem assembly of claim 8, wherein said stem tube extends at generally a right angle to the axis of said sleeve.

10. The stem assembly of claim 9, wherein said stem tube has a generally rectangular cross-section at its connection to said sleeve.

* * * * *